3,308,090
PROCESS FOR THE PREPARATION OF VULCANIZATES FROM MIXES OF OLEFINIC COPOLYMERS, MINERAL FILLERS AND A DISPERSION PROMOTER, AND VULCANIZED ARTICLES THEREOF
Luigi Falcone, Como, and Luigi Torti, Ferrara, Italy, assignors to Montecatini Edison S.p.A., Milan, Italy
No Drawing. Filed Jan. 28, 1965, Ser. No. 428,871
Claims priority, application Italy, Jan. 29, 1964, 1,978/64
24 Claims. (Cl. 260—41)

This invention relates to a process for the preparation of vulcanized products having improved mechanical properties, from mixes consisting of saturated, amorphous copolymers of ethylene with alpha-olefins, a white mineral filler, a dispersion promoter and vulcanizing agents. The invention relates further to vulcanized articles obtained from the above mixes.

This application is a continuation in part of application Ser. No. 212,112, filed July 24, 1962, which describes a process for preparing vulcanized products having improved mechanical and electrical characteristics by starting from mixes based on amorphous, saturated copolymers of ethylene with alpha-olefins, white mineral fillers, and a dispersion promoter of the filler, said promoter being an organic compound containing an olefinic double bond which is conjugated with the double bond between C and O of one or more

groups, and then subjecting these mixes to a thermomechanical treatment in the absence of vulcanizing agents. These vulcanizing agents, consisting of an organic peroxide and a co-agent, are added to the mixes after these have been cooled.

Particularly good results have been obtained in the above process, by using maleic acid or maleic anhydride, and a thermo-mechanical pre-treatment in an inner Banbury type mixer of the mixture at a temperature of 200°–300° C. Under these conditions the maleic acid easily dehydrates forming the corresponding anhydride which is very volatile. This phenomenon causes an uncontrolled loss of the dispersion promoter and the release of vapors which strongly irritates the eyes and the mucus of the respiratory organs. Maleic acid, furthermore, is a "strong" acid, with respect to its first dissociation constant and, in the presence of humidity, corrosion may occur in the equipment used for processing the mixtures.

An object of the present invention is a process for the preparation of vulcanized products having improved mechanical properties by employing, as dispersion promoters of the white mineral fillers, compounds which not only are particularly active, but also offer surprising advantages as compared with previously used promoters.

It has now been found that compounds, derived from maleic acid, and characterized in that they possess, in their molecular structure, at least two terminal maleic functions, and provided, like maleic acid and the other compounds containing an olefinic double bond, which is conjugated with the double bond of a group

in accordance with our previous disclosure, will offer surprising qualities as agents to promote the dispersion of the white mineral fillers in mixes based on an olefin copolymer and a mineral filler, without presenting the disadvantages of volatility, toxicity and corrosion, which the use of maleic acid introduces.

The promoters containing two or more maleic groups, which may be employed according to the invention, are selected from the group consisting of a diamine derivative of maleic acid having two maleic groups, a diepoxy derivative of maleic acid having two maleic groups, a diamine derivative of maleic anhydride having two maleic groups, a diepoxy derivative of maleic anhydride having two maleic groups, a copolymer of maleic acid with a vinyl compound, and a copolymer of maleic anhydride with a vinyl compound. More particularly, the diamine derivatives are the dimaleamic acids and the dimaleimides i.e. the condensation products of two molecules of maleic acid or anhydride with one molecule of a diamine, to form promoters of the type:

$$\begin{array}{c} \text{C—CO—NH—R—NH—CO—C} \\ \parallel \qquad \qquad \qquad \qquad \qquad \parallel \\ \text{C—COOH} \qquad \qquad \text{HOOC—C} \end{array}$$

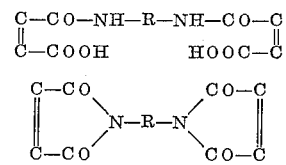

wherein R is an arylene or alkylene radical having from 2 to 10 carbon atoms. The diepoxy derivatives are the condensation products of two molecules of maleic acid or anhydride with one molecule of micro- or macromolecular diepoxide. The copolymers suitable as promoters according to the present invention, are the copolymers of maleic acid with vinyl esters, vinyl ethers, vinyl chloride, styrene and other vinyl monomers.

The promoters may be employed in amounts of from 0.1 to 15 parts, and are preferably used in amounts from 0.2 to 10 parts by weight per 100 parts of filler. By way of example, among micromolecular maleic promoters we could mention: hexamethylene-dimaleimide and hexamethylene-dimaleamic acid, phenylene-dimaleimide, the condensation product of maleic acid with the epoxy resins, formed by the alkaline condensation of bisphenol A and epichlorohydrin; among the macromolecular promoters: the 1:1 copolymer maleic acid:divinylbenzene, the 1:1 copolymer of maleic anhydride with methyl-vinyl-ether, and the 1:1 copolymer maleic acid:vinyl acetate. Copolymers having ratios other than 1:1 may be used.

A further object of this invention is that, unlike the maleic acid promoters, the present promoters appear to be active for the purpose of reinforcing the mixes with white mineral fillers in absence of thermal treatment, although in this case the mechanical characteristics of the vulcanizates are slightly lower but are satisfactory. If, however, the thermo-mechanical treatment described in the previous disclosure is carried out, the characteristics of the vulcanizates appear to be improved further.

In the case of the maleic acid, the mechanism of the dispersion and reinforcement of the mineral fillers was attributed to the simultaneous presence, in its molecule, of both the polar function of the C=O group, and that of vinyl group. The mineral polar group is supposed to be absorbed on the surface of the mineral filler, while the vinyl bond, which is easily reactive with the polymer chain radicals formed by the peroxidic cross-linking agent, determines the bond between filler and polymer. Actually, in the absence of the vinyl function, using e.g. succinic acid, a remarkable decrease of the reinforcement occurs.

In the promoters containing more than one maleic function capable of reacting independently according to the above illustrated mechanism, there would be, during the vulcanization, knots formed by the cross-linking of two polymeric chains. This corresponds to a cross-linked structure formed by less deformable meshes and, therefore, lower values of elongation at break occur.

The amorphous and elastomeric saturated copolymers of ethylene with alpha-olefins which may be employed for the purpose of the present invention are, preferably, the copolymers of ethylene with propylene or butene-1. They have, preferably, a content of from 20 to 80% by mols of ethylene and a molecular weight comprised between 40,000 and 600,000, preferably between 60,000 and 300,000.

The vulcanizing agents used are based on organic peroxide and sulfur, in amounts, respectively, of 0.1–10 parts by weight of peroxide per 100 parts of copolymer, and in amounts from 0.3 to 1.5 g. atoms of sulfur per mole of peroxide.

The white mineral filler is selected from the group consisting of carbonates and sulphates of alkali-earth metals, of silica and of complex silicates, both natural and synthetic, preferably kaolin, clay, talc, calcium carbonate and barium sulphate, and it is used in a filler to copolymer ratio of between 0.3:1 and 2:1.

Besides the above mentioned ingredients there may be used stabilizers, basic compounds correcting the acidity of the filler, extending oils, and other additives.

The vulcanization temperature is between 110° and 220° C., preferably between 140° and 180° C.

It is to be understood that following examples illustrate the invention without, however, limiting its scope.

First of all the technique of preparing the mixes and of some macromolecular promoters is described.

*Technique of preparing the mixes*

Depending on the cases, in order to show the efficiency of the new promoters also without thermal pre-treatment of the mixes, the latter have been prepared either with the "cold" technique or with the "hot" technique.

For the "cold" preparation of the mixes all the ingredients were consecutively added and processed on a conventional roll-mixer, following the order and the times indicated hereafter:

Time minutes:
- 0 _____ olefin copolymer.
- 3 _____ one half of the mineral filler.
- 10 _____ second half of the filler + promoter (plus—if desired—ZnO and glycerin).
- 15 _____ vulcanizing agents (sulfur + organic peroxide).
- 20 _____ discharge of the mix.

The technique of the "hot" preparation was that the mixes were prepared in an inner Banbury type mixer, adding the ingredients in the following order:

Time minutes:
- 0 _____ olefin copolymer.
- 2 _____ one half of the mineral filler.
- 6 _____ second half of the filler + promoter.
- 11 _____ ZnO +, if desired, glycerine.

After a total of 15 minutes, the temperature is raised up to 200° C., and the mix is processed on the inner mixer for another 15 minutes. It is then dischared and conveyed on a conventional mixer having cooled rolls, where the vulcanizing agents (sulfur + organic peroxide) are added in the usual way.

The preparation of some products used in the examples is described as follows:

Preparation of copolymers of maleic anhydride with divinylbenzene in equimolecular ratio.

98 g. (1 mole) of maleic anhydride are cold-dissolved with 130 g. (1 mole) of divinylbenzene in 450 g. of xylene; the solution is heated to 135–140° C.; the whole is agitated over 30 minutes while the copolymer separates in the solid state; when the reaction is completed, the solvent is distilled in a steam current, and the copolymer is washed with acetone and dried in oven at low temperature. 80 g. of copolymer in the form of whitish powder are obtained.

Preparation of the condensation product of maleic anhydride with an epoxy resin.

Condensation is carried out of two moles of maleic anhydride with one mole of epoxy resin Epikote 1001 (condensation product of bisphenol A and epichlorohydrin, having the melting point at 74–76° C., and molecular weight of about 900, produced by Shell) at the temperature of 50–80° C., until complete dissolution of the maleic anhydride. The reaction product is employed as it is.

In the following examples the mechanical characteristics of the vulcanizates are indicated with the initials and determined by the methods as follows:

$C.R.$ = tensile strength (kg./cm.$^2$) ASTM D 412–51T.

$A.R.$ = elongation at break (%) ASTM D 412–51T.

$E_{100}$ = elastic modulus at 100% elongation (kg./cm.$^2$) ASTM D 412–51T.

$E_{300}$ = elastic modulus at 300% elongation (kg./cm.$^2$) ASTM D 412–51T.

$D_1$ = residual deformation (%)—tractional stress at 200% for 1 hour, reading of residual elongation after 1 minute—ASTM D 412–51T modified.

Tear = resistance to tearing (kg./cm.$^2$) ASTM D 624–54.

EXAMPLE 1

According to the two indicated techniques, 3 mixes of the following composition were prepared using an ethylene-propylene copolymer having an ethylene content of 50% by mols and Mooney viscosity (ML (1+4) at 100° C.) of 50:

Composition of mix: Parts by weight
- Ethylene-propylene copolymer _____ 100
- Calcined kaolin (Whitetex) _____ 100
- Promoter (as indicated in Table 1) _____ 5
- ZnO _____ 2
- Sulfur _____ 0.4
- Tetrachloro-di-tert. butyl-peroxide (PX–40) __ 3.5

The mixes were then vulcanized in a press at 165° C. for 50 minutes and the mechanical characteristics were determined as reported in Table 1.

TABLE I

| Thermal treatment in Banbury type GK/2 (200° C./15 minutes) | Yes | No | Yes | No | Yes | No | Yes | No | Yes | No |
|---|---|---|---|---|---|---|---|---|---|---|
| Vulcanization conditions in the press | \multicolumn{10}{c}{50 minutes/165° C.} |
| Promoter | C.R. | | A.R. | | $E_{100}$ | | $E_{300}$ | | $D_1$ | |
| Maleic acid | 75 | 55 | 350 | 500 | 27 | ---- | 70 | 50 | 11 | 9 |
| MA:RE | 80 | 70 | 270 | 320 | 33 | ---- | ---- | 68 | 8 | 10 |
| Hexamethylendimaleamic acid | 89 | 65 | 270 | 320 | 33 | ---- | ---- | 60 | 7 | 9 |

MA:RE = Condensation product maleic acid/epoxy resin (Shell Epikote 1001).

For purposes of comparison, the measurements obtained on the vulcanizates containing, respectively, as promoter, the maleic acid according to the previous disclosure, the condensation product of maleic acid with epoxy resin, and the hexamethylendimaleamic acid.

The mixes vulcanized in a press at 165° C. for 50 minutes, have mechanical characteristics as shown in Table II.

TABLE II

| Filler | Promoter | C.R. | A.R. | $E_{300}$ | $D_1$ | Tear |
|---|---|---|---|---|---|---|
| Calcined kaolin (Whitetex), 100 parts by weight. |  | 45 | 600 | 30 | 12.5 | 30 |
|  | Maleic acid | 55 | 500 | 50 | 10.5 | 28 |
|  | MA:RE | 70 | 320 | 68 | 10 | 35 |
|  | Maleamic acid | 65 | 320 | 60 | 9 | 36 |
| Blown kaolin (Windsor Clay), 100 parts by weight. |  | 85 | 720 | 25 | 20 | 36 |
|  | Maleic acid | 75 | 650 | 35 | 18 | 35 |
|  | MA:RE | 78 | 500 | 65 | 13 | 41 |
|  | Maleamic acid | 60 | 300 | 50 | 11 | 45 |
| Calcium carbonate (fine) (SOCAL-U1), 100 parts by weight. |  | 60 | 670 | 16 | 12.5 | 18 |
|  | Maleic acid | 59 | 600 | 25 | 11 | 23 |
|  | MA:RE | 56 | 600 | 30 | 11.5 | 20 |
|  | Maleamic acid | 58 | 370 | 48 | 10 | 31 |
| Talcum, 100 parts by weight |  | 33 | 500 | 22 | 18 | 22 |
|  | Maleic acid | 30 | 500 | 25 | 14 | 25 |
|  | MA:RE | 45 | 300 | 35 | 12 | 35 |
|  | Maleamic acid | 32 | 280 | 31 | 9 | 32 |
| Silicic acid hydrate (Hi-Sil), 50 parts by weight. |  | 155 | 700 | 33 | 18 | 42 |
|  | Maleic acid | 145 | 650 | 40 | 16 | 40 |
|  | MA:RE | 155 | 630 | 45 | 14 | 35 |
|  | Maleamic acid | 135 | 550 | 55 | 12.5 | 51 |
| Anhydrous silicic acid (Aerosil), 50 parts by weight. |  | 150 | 730 | 30 | 28 | 41 |
|  | Maleic acid | 155 | 680 | 40 | 20 | 39 |
|  | MA:RE | 180 | 600 | 60 | 16 | 45 |
|  | Maleamic acid | 150 | 600 | 45 | 14 | 32 |

MA:RE=Condensation product maleic acid/di-epoxy product.

EXAMPLE 2

In this example we have compared the results obtained with various micromolecular promoters related to the type of mineral filler, for mixes prepared without thermal pre-treatment. As comparison we report, with the same fillers, the action of the micromolecular promoters of Example 1. The basic composition is as follows:

Parts by weight

Ethylene-propylene copolymers (50% mols of ethylene and ML=50) _____ 100
Reinforcing fillers (as stated in Table II).
ZnO _____ 2
Sulfur _____ 0.4
Tetrachloro-di-tert. butyl-peroxide (PX-40) _____ 3.4
Promoter (as stated in Table II) _____ 5

EXAMPLE 3

In this case we have made a comparison of the mixes obtained, preparing them according to both the "hot" and the "cold" technique, with macromolecular promoters.

The mixes, the composition of which is shown in Table III, were vulcanized in a press at 165° C. for 50 minutes.

TABLE III

| | | | | | | |
|---|---|---|---|---|---|---|
| Ethylene-propylene copolymer 50% mols ethylene and ML=50 | 100 | | 100 | | 100 | |
| Calcined kaolin (Whitetex) | 100 | | 100 | | 100 | |
| MA-DI |  | | 10 | |  | |
| Gantrez |  | |  | | 10 | |
| ZnO | 2 | | 2 | | 2 | |
| Sulfur | 0.4 | | 0.4 | | 0.4 | |
| Tetrachloro-di-tert. butyl-peroxide (PX-40) | 3.4 | | 3.4 | | 3.4 | |
| Thermal treatment in Banbury type GK/2 (200° C. x 15 minutes) | Yes | No | Yes | No | Yes | No |
| Tensile strength, kg./cm.² | 50 | 45 | 55 | 50 | 65 | 45 |
| Elongation at break, percent | 450 | 600 | 340 | 500 | 450 | 450 |
| Elastic modulus at 300%, kg./cm.² | 40 | 30 | 55 | 45 | 50 | 40 |
| Residual deformation | 11.5 | 12.5 | 10 | 10 | 10 | 11 |
| Tear strength, kg./cm.² | 36 | 30 | 38 | 32 | 35 | 33 |

MA-DI=Copolymer 1:1 maleic anhydride/divinyl benzene.
Gantrez=Copolymer 1:1 maleic anhydride/methyl-vinyl-ether, having specific viscosity 0.1-0.5 produced by General Aniline & Film Corp.

EXAMPLE 4

The results obtained with two macromolecular promoters in mixes prepared with the "cold" technique, in connection with different types of mineral filler are shown. The basic composition is as follows:

Parts by weight

Ethylene-propylene copolymer (48% mols of ethylene and ML=50) _____ 100
Reinforcing filler (as stated in Table IV).
ZnO _____ 2
Sulfur _____ 0.4
Tetrachloro-di-tert. butyl-peroxide (PX-40) _____ 3.4
Promoter _____ 10

The mixes were vulcanized in a press at 165° C. for 50 minutes. The characteristics are illustrated in the following Table IV.

TABLE IV

| Filler | Promoter | C.R. | A.R. | $E_{300}$ | $D_1$ | Tear |
|---|---|---|---|---|---|---|
| Calcined kaolin (Whitetex), 100 parts by weight | | 45 | 600 | 30 | 12.5 | 30 |
| | MA-DI | 50 | 500 | 45 | 10 | 32 |
| | Gantrez | 45 | 450 | 40 | 11 | 33 |
| Blown kaolin (Windsor Clay), 100 parts by weight. | | 85 | 720 | 25 | 20 | 36 |
| | MA-DI | 67 | 670 | 35 | 16 | 36 |
| | Gantrez | 62 | 700 | 30 | 20 | 33 |
| Calcium carbonate, fine (Socal U-1, 100 parts by weight. | | 60 | 630 | 16 | 12.5 | 18 |
| | MA-DI | 48 | 550 | 30 | 10 | 20 |
| | Gantrez | 40 | 600 | 25 | 12 | 23 |
| Talc, 100 parts by weight | | 33 | 500 | 22 | 18 | 22 |
| | MA-DI | 35 | 450 | 26 | 14 | 27 |
| | Gantrez | 30 | 500 | 22 | 20 | 25 |
| Silicic acid-hydrate (Hi-Sil), 50 parts by weight. | | 155 | 700 | 22 | 18 | 42 |
| | MA-DI+3 ppc glycerine | 135 | 650 | 40 | 18 | 46 |
| | Gantrez+3 ppc glycerine | 120 | 500 | 45 | 18 | 43 |
| Silicic acid-anhydrous (Aerosil), 50 parts by weight. | | 150 | 730 | 30 | 28 | 41 |
| | MA-DI+4 ppc glycerine | 120 | 650 | 35 | 14 | 28 |
| | Gantrez+4 ppc glycerine | 125 | 675 | 30 | 14 | 28 |

MA-DI=Copolymer 1:1 maleic anhydride/divinyl benzene.
Gantrez=Copolymer 1:1 maleic anhydride/methylvinyl ether.

Some comparison tests have also been reported for the cases in which small amounts of glycerine are present. As known, this improves the reinforcing effect when fillers based on silicic acid are added to the promoter according to the invention.

While the present invention has been described with particular reference to specific examples, it is not to be limited thereby, but reference is to be had to the appended claims for a definition of its scope.

Having thus described our invention, what we desire to secure and hereby claim by Letters Patent is:

1. A process for preparing a vulcanized product having high mechanical properties, said process comprising mixing a saturated and amorphous copolymer of ethylene and a higher alpha-olefin having the formula $$CH_2=CH-CH_2R$$

in which R is selected from the group consisting of hydrogen and methyl group, with a reinforcing mineral filler selected from the group consisting of alkaline earth metal carbonates, alkaline earth metal sulfates, silica, natural complex silicates and synthetic complex silicates, and with a dispersion promoter selected from the group consisting of a diamine derivative of maleic acid having two maleic groups, a diepoxy derivative of maleic acid having two maleic groups, a diamine derivative of maleic anhydride having two maleic groups, a diepoxy derivative of maleic anhydride having two maleic groups, a copolymer of maleic acid with a vinyl compound and a copolymer of maleic anhydride with a vinyl compound, in an amount of from 0.1 to 15 parts by weight per 100 parts of filler, subjecting the thus obtained mix to mechanical homogenization, then adding a vulcanizing amount of an organic peroxide and sulfur and, finally, vulcanizing the whole mix by heating at a temperature between 110° and 220° C.

2. The process of claim 1 wherein the mixture of copolymer, mineral filler and dispersion promoter is heated at 200° C. while being subjected to mechanical homogenization, and then cooled below the decomposition temperature of the organic peroxide before the addition of said organic peroxide and sulfur.

3. A process acording to claim 1 in which the copolymers used have an ethylene content between 20 and 80% by mols and a molecular weight between 60,000 and 300,000.

4. The process of claim 1, wherein a basic compound is used to correct the acidity of the filler.

5. A process according to claim 1, wherein the promoter is

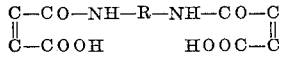

where R is an alkylene radical containing from 2 to 10 carbon atoms.

6. A process according to claim 1, wherein the promoter is

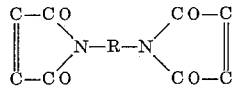

where R is an alkylene radical containing from 2 to 10 carbon atoms.

7. A process according to claim 1, wherein the promoter is

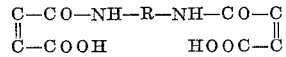

where R is an arylene radical containing from 6 to 10 carbon atoms.

8. A process according to claim 1, wherein the promoter is

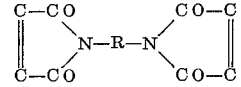

where R is an arylene radical containing from 6 to 10 carbon atoms.

9. A process according to claim 1, where the promoter consists of a condensation product of two maleic acid molecules with one mole of diepoxide.

10. A process according to claim 1, where the promotor consists of a condensation product of two maleic anhydride molecules with one mole of diepoxide.

11. A process according to claim 1, where the promoter consists of a copolymer of maleic acid with a vinyl compound.

12. A process according to claim 1, where the promoter consists of a copolymer of maleic anhydride with a vinyl compound.

13. A process according to claim 5 in which the promoter is hexamethylendimaleamic acid.

14. A process according to claim 6, in which the promoter is hexamethylendimaleimide.

15. A process according to claim 8, in which the promoter is phenylen-di-maleimide.

16. A process according to claim 9 in which the promoter is the condensation product of maleic acid with an epoxy resin formed by condensing bisphenol A and epichlorohydrin.

17. A process according to claim 11, in which the promoter is a copolymer (1:1) of maleic acid with divinylbenzene.

18. A process according to claim 12, in which the promoter is a copolymer (1:1) of maleic anhydride with methyl-vinyl ether.

19. A process according to claim 11, in which the promoter is a copolymer (1:1) of maleic acid with vinyl chloride.

20. A process according to claim 11, in which the promoter is a copolymer (1:1) of maleic acid with styrene.

21. A process according to claim 1, wherein the amount of promoter is between 0.2 and 10 parts by weight, per 100 parts of mineral reinforcing filler.

22. A process according to claim 1, wherein the filler to copolymer ratio comprises between 0.3:1 and 2:1.

23. A process according to claim 1, in which the copolymers used have an ethylene content between 20 and a 80% by mols and molecular weight between 40,000 and 600,000.

24. A process according to claim 1, wherein the vulcanization of the mix is carried out at a temperature between 140° and 180° C.

References Cited by the Examiner
UNITED STATES PATENTS

| | | | |
|---|---|---|---|
| 2,913,437 | 11/1959 | Johnson | 106—308 |
| 3,085,077 | 4/1963 | Floyd. | |
| 3,173,903 | 3/1965 | Lukach et al. | 260—41 |

MORRIS LIEBMAN, *Primary Examiner.*

A. LIEBERMAN, *Assistant Examiner.*